(No Model.)

R. M. MELHUISH.
COMPOSITE BEARING BLOCK FOR SCREW SHAFTS.

No. 582,074. Patented May 4, 1897.

WITNESSES.

INVENTOR:
R. M. Melhuish.
BY
ATTORNEYS

UNITED STATES PATENT OFFICE.

RICHARD MATTHEW MELHUISH, OF LONDON, ENGLAND.

COMPOSITE BEARING-BLOCK FOR SCREW-SHAFTS.

SPECIFICATION forming part of Letters Patent No. 582,074, dated May 4, 1897.

Application filed April 1, 1896. Serial No. 585,784. (No model.) Patented in France September 18, 1895, No. 250,368; in Belgium September 19, 1895, No. 117,488, and in Canada December 6, 1895, No. 50,763.

*To all whom it may concern:*

Be it known that I, RICHARD MATTHEW MELHUISH, of London, England, have invented certain new and useful Improvements in Composite Bearing-Blocks for Screw-Shafts, (for which I have obtained Letters Patent in France, dated September 18, 1895, No. 250,368; in Belgium, dated September 19, 1895, No. 117,488, and in Canada, dated December 6, 1895, No. 50,763,) of which the following is a full, clear, and exact description.

This invention relates more particularly to bearings for feed-screw shafts for sewing-machines, such as shown in my application for patent filed October 9, 1895, Serial No. 565,151, although I do not limit its application to a sewing-machine, and it may be applied to line-engraving machines or the like.

The object of my invention is to provide a simple means to prevent shaking or jarring of the feed-screw, to enable slack to be taken up, and to insure such a motion of the feed-screw shaft as to prevent liability of its overrunning its actuating-gear by its acquired momentum.

I will describe a device embodying my invention and then point out the novel features in the appended claims.

Reference is to be had to the accompanying drawings, forming a part of this specification, in which similar characters of reference indicate corresponding parts in all the figures.

Figure 1:
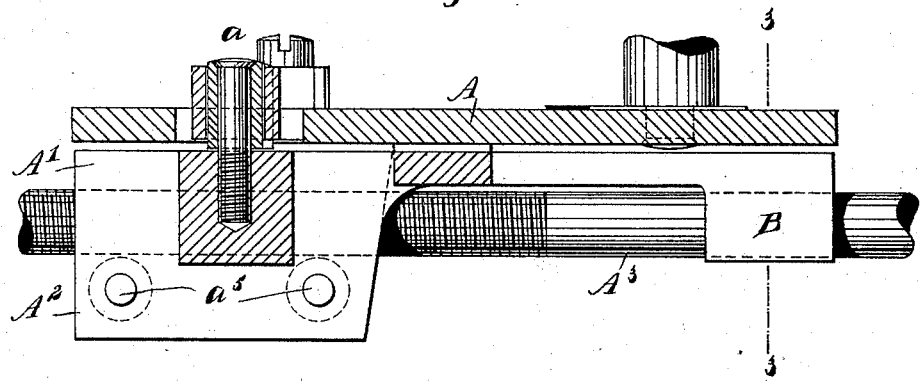
Figures 2, 3:
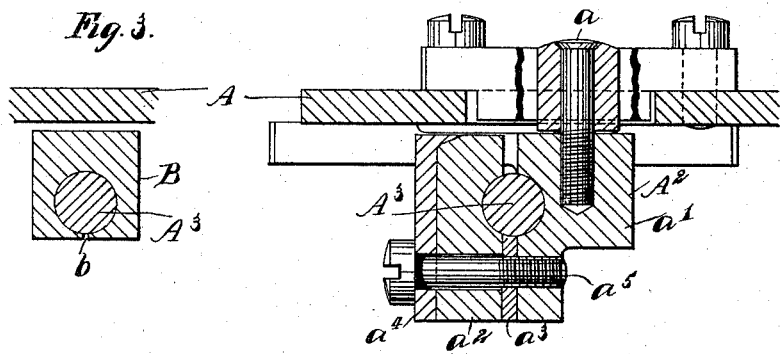

Figure 1 is a partial elevation and partial section of a device embodying my invention. Fig. 2 is a transverse section thereof, and Fig. 3 is a section on the line 3 3 of Fig. 1.

Referring to the drawings, A designates a table-plate pivotally connected by means of a screw $a$ to a carrier A', having a longitudinally-threaded nut portion $A^2$, with which the thread of a feed-screw $A^3$ engages.

The feed-nut $A^2$ is of peculiar construction, being formed one half of metal and the other half of gutta-percha, leather, wood, horn, or other material capable of being softened by a liquid without destroying its integrity, so as to admit of the counterpart of the thread of the feed-screw being formed by pressure.

The metal portion of the nut is forged solid and drilled and tapped in the usual manner. It is then divided longitudinally, and about one-half only of this metal portion is used, as indicated at $a'$. The other half $a^2$ of the nut consists of yielding material capable of being compressed and also capable of being softened by hot water. Between the parts $a'$ $a^2$ a liner-plate $a^3$ is placed, and a clamp-plate $a^4$ engages against the outer side of the nut portion $a^2$, and this clamp-plate has a flange portion engaging with the top of the yielding portion $a^2$. Clamping-screws $a^5$ pass through holes in the plate $a^4$, the yielding material, and liner-plate and engage in tapped holes in the metal portion of the nut.

In use the yielding portion of the nut is tightened up against the feed-screw with sufficient pressure to receive the imprint of the screw-thread, and this pressure may be regulated by means of the clamp-screws, and by means of these clamp-screws slackness may be taken up as the nut wears, and the yielding portion of the nut may be easily renewed by softening it in water and then impressing a fresh thread.

As an additional means for providing a steady bearing between the nut and feed-screw I employ a sleeve B, which surrounds a plain portion of the feed-screw. This sleeve B is formed on an extension from the carriage A', and in forming the sleeve it is first provided with a bore of a slightly less diameter than that of the feed-screw shaft and is then slit lengthwise, as indicated at $b$, thus rendering the sleeve sufficiently resilient to permit of its being slipped over the screw-shaft, which it will grasp with sufficient force to steady the motion between the screw and nut. Any wear of the sleeve may be taken up by squeezing together its divided sides.

In treating the yielding material I find that hot water will soften gutta-percha without destroying its integrity—that is to say, the gutta-percha may be sufficiently softened in hot water to allow it to be forced into place and shaped, and then an application of cold water will harden it sufficiently to retain the impression of the screw-thread. Wood, horn, or the like may also be softened by hot water, but in case of leather I will employ hot oil.

Having thus described my invention, I claim as new and desire to secure by Letters Patent—

1. A nut for a screw-shaft, comprising a metal portion having a threaded longitudinal groove, and a longitudinal grooved portion of yielding material, capable of being softened by a liquid without destroying its integrity, substantially as specified.

2. A nut, comprising a longitudinally-grooved metal portion, a longitudinally-grooved portion of yielding material, capable of being softened by a liquid without destroying its integrity, and means for detachably securing the parts together, substantially as specified.

3. The combination with a screw-shaft, of a nut therefor comprising a metal portion and a yielding portion, capable of being softened by a liquid without destroying its integrity, the said two portions being held longitudinally together, a clamp-plate for engaging the outer side of the yielding portion, and clamping-screws, substantially as specified.

4. The combination with a carriage and a feed-screw, of a nut on the carriage for engaging the screw, and a circumferentially yielding or resilient sleeve supported by the carriage and engaging the screw-shaft, substantially as specified.

RICHARD MATTHEW MELHUISH.

Witnesses:
W. M. HARRIS,
GEO. J. B. FRANKLIN.